United States Patent [19]
Carroll et al.

[11] 3,970,319
[45] July 20, 1976

[54] SEAL STRUCTURE

[75] Inventors: Charles D. Carroll, Greensburg; George B. Meginnis, Indianapolis, both of Ind.

[73] Assignee: General Motors Corporation, Detroit, Mich.

[22] Filed: May 3, 1974

[21] Appl. No.: 466,740

Related U.S. Application Data

[62] Division of Ser. No. 307,446, Nov. 17, 1972.

[52] U.S. Cl. .................................. 277/53; 277/193; 277/215; 277/233; 415/174
[51] Int. Cl.² ...................................... F16J 15/44
[58] Field of Search ............... 415/174; 277/53, 55, 277/96 R, 215, 233, 236, 123, 193

[56] References Cited
UNITED STATES PATENTS

| | | | |
|---|---|---|---|
| 2,422,248 | 6/1947 | Lord | 277/123 |
| 3,719,365 | 4/1924 | Emmerson et al. | 277/53 |
| 3,825,364 | 7/1974 | Halila et al. | 277/53 |

Primary Examiner—Richard E. Aegerter
Assistant Examiner—L. Footland
Attorney, Agent, or Firm—Paul Fitzpatrick

[57] ABSTRACT

A porous seal element usable as a blade tip seal in a turbomachine or as an element of a labyrinth seal is made up of a large number of strips disposed edgewise to the sealing face of the element and extending in the direction of relative movement of the seal elements. The strips have grooves extending across the strip for discharge of a cooling fluid such as air. The presence of the grooves provides a low density structure at the seal face of the seal element which may be abraded if there is rubbing contact and provides for metering of coolant at the rear face of the seal element. The seal element is fabricated by etching sheets so each sheet defines a number of parallel strips joined by weak ties and with the grooves extending across the strips; stacking the sheets and bonding them together; and then separating the bonded structure at the weak ties so that each stack of strips defines a seal element.

4 Claims, 8 Drawing Figures

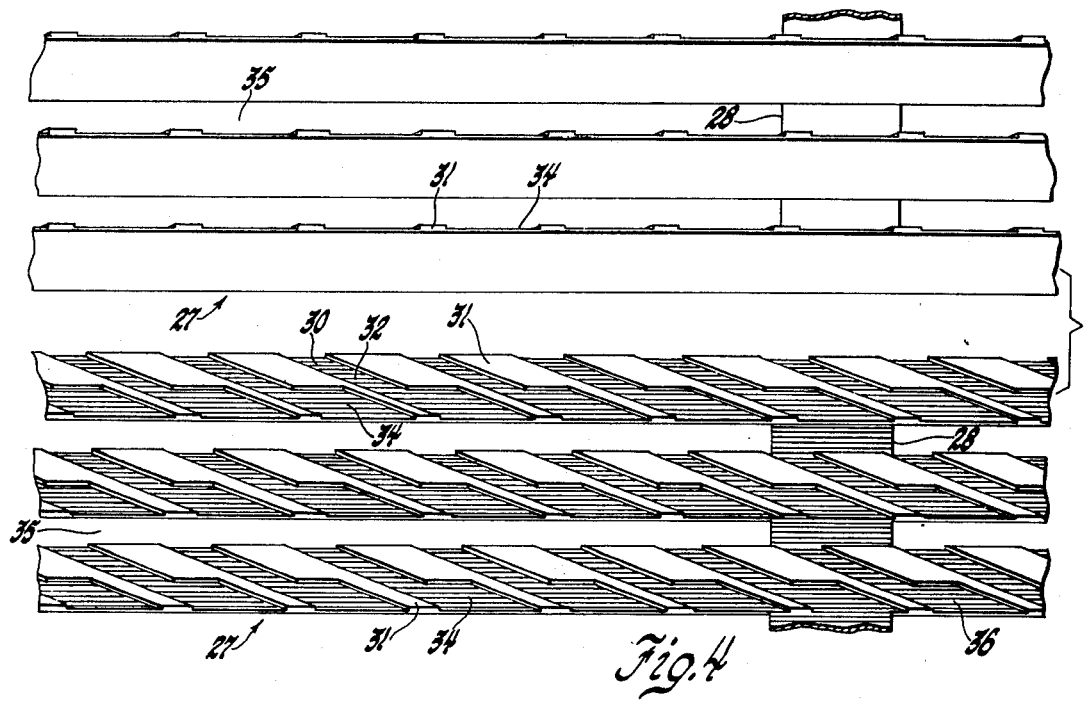
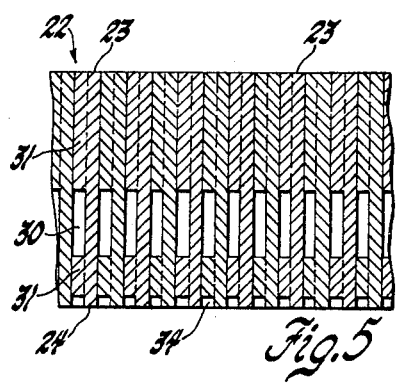
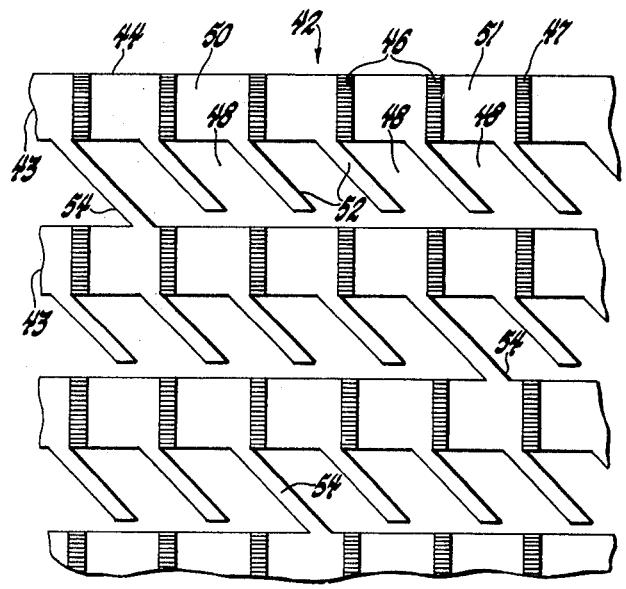
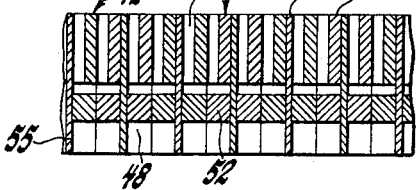

SEAL STRUCTURE

This application is a division of our application Ser. No. 307,446 filed Nov. 17, 1972.

The invention described herein was made in the course of work under a contract with the Department of Defense.

Our invention is directed to providing improved porous structures, ordinarily in ring form, to provide a porous gas-cooled abradable element of a labyrinth seal or other structure of this general sort.

It is well known that rotating machines such as compressors and turbines, for example, ordinarily have parts rotating at high speed relative to each other across which there are pressure differences which make provision of seals to minimize leakage very important. Particularly in larger machines for aircraft in which the structure is relatively light and in those in which thermal expansion is quite considerable, there arise serious problems of minimizing clearance of blade tip or other labyrinth type seals without destructive rubbing of the parts.

This problem has led to various proposed abradable seal elements, among them porous metallic structures such as those shown in U.S. Pat. No. 3,365,172 to McDonald, Jan. 23, 1968; U.S. Pat. No. 3,411,794 to Allen, Nov. 19, 1968; and U.S. Pat. No. 3,529,905 to Meginnis, Sept. 22, 1970; also in the U.S. Pat. application of Emmerson, Griffin, and Meginnis Ser. No. 190,179, filed Oct. 18, 1971, [U.S. Pat. No. 3,719,365]. By providing a sufficiently open, reticulate, or porous structure, a metallic seal element may be sufficiently abradable or crushable that contact with the rotating blade tips, ridges, or knives on the other member of the seal will provide the necessary clearance for rotation without damaging the other member of the seal or destroying the effectiveness of the abradable part.

In many cases it is considered desirable to cool the parts of the seal, which may be done, for example, by passing air diverted from the compressor of a gas turbine engine through a porous seal ring with the air exhausting into the space between the two elements of the seal.

We consider it desirable to provide a structure for a cooled seal giving efficient and consistent use of the cooling air along with an abradable structure of such nature that wear or abrasion of the sealing face of the ring does not harmfully alter the fluid flow characteristics of the ring. We also consider it quite desirable to provide a structure such that the cooling air is discharged from the cooled seal ring in a tangential direction according with the direction of movement of the other element of the seal. This minimizes fluid friction opposing relative movement of the parts and tends to energize any stagnant boundary layer adjacent the seal ring.

It may be noted that the structure of the Emmerson et al application referred to above is directed to the same general purpose. As will be seen, the nature of the preferred embodiment of our invention and its method of fabrication are quite different from those of the prior application.

The objects of our invention are to provide improved labyrinth seal structures, to provide improved cooling arrangements for labyrinth seals of turbomachines, and to provide improved porous laminated structures particularly suited for use as seal rings. As used here, the term labyrinth applies to any seal in which leakage occurs through a gap between a surface on one member and an edge or ridge on another, or a plural number of edges or ridges.

The nature of our invention and the manner in which our objects are achieved will be clearly understood by those skilled in the art from the succeeding detailed description of preferred embodiments of the invention and the accompanying drawings thereof.

FIG. 4 is a perspective view illustrating the stacking of the sheets to provide the laminated structure.

FIG. 5 is an enlarged partial cross-sectional view through the seal structure taken on the plane indicated by line 5—5 in FIG. 2.

FIG. 6 is a view similar to FIG. 3 of a different embodiment of the invention.

FIG. 7 is a fragmentary enlarged sectional view of a seal structure according to the second embodiment, taken on a plane indicated by the line 2—2 in FIG. 1.

FIG. 8 is a sectional view of the same taken on the plane indicated by the line 8—8 in FIG. 7.

Figure 1:
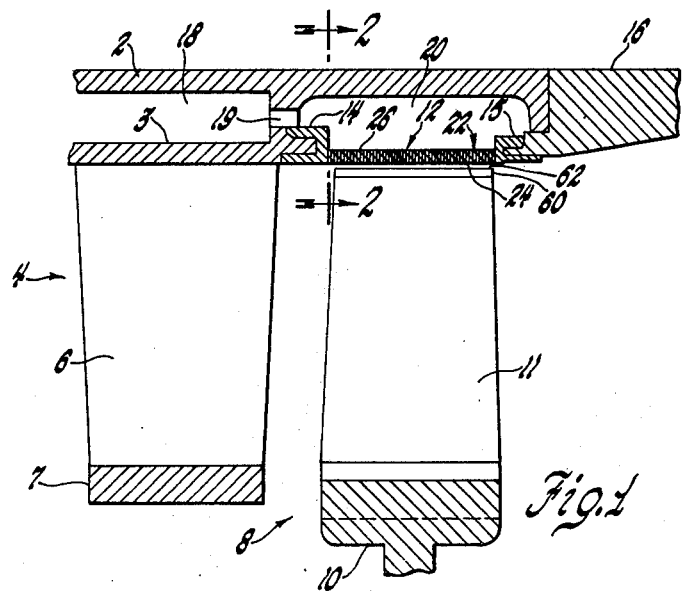
FIG. 1 is a somewhat schematic partial sectional view of an axial-flow turbine taken on a plane containing the axis of rotation.

FIG. 1 shows enough of the structure of an axial-flow turbine to explain a use of our improved seal element. A turbine case 2 has mounted within it by any suitable conventional means the outer shroud 3 of a turbine nozzle 4, which includes an annular cascade of vanes 6 and an inner shroud 7. The nozzle 4 directs motive fluid to a rotor stage 8 comprising a wheel 10, only the peripheral portion of which is illustrated, and an annular row of blades 11 extending radially from the wheel. A fixed shroud 12 extending around the rotor immediately adjacent the tips of the blade 11 embodies our invention. This shroud is a composite structure including a forward channel section ring 14 and a rear channel section ring 15. The forward ring pilots onto the rear edge of the turbine nozzle shroud 3 and the rear ring engages a forwardly projecting flange on an annular wall structure 16, which may be the turbine exhaust duct or may be the case for a succeeding turbine stage. The shroud 12 is of a porous nature so as to be cooled by air supplied to it. This air, which may come from the compressor (not shown) of the engine is supplied through the space 18 outside shroud 3 and through the ring of openings 19 into a chamber or plenum 20 between the case 2 and shroud 12. Except for the structure of the shroud 12, to be explained, the organization just described may be considered conventional and may incorporate various known suitable details of structure.

Our invention is primarily concerned with the porous abradable seal structure or seal ring 22 which forms the principal part of the length of the shroud 12, the portion 22 being diffusion bonded or otherwise fixed to the forward ring 14 and rear ring 15 to define the complete shroud ring. Preferably, this shroud 12 is segmented and, in the particular example described, may be in eight 45° segments. Suitable means may be provided to locate the segments of the shroud 12 circumferentially of the turbine case, following known practice.

Before proceeding to the details of structure and mode of fabrication of the seal ring 22, it may be well to point out that we are aware that laminated structures for service as abradable seal elements have been proposed in the past. In addition to the Emmerson et al application referred to above, we call attention to U.S. Pat. No. 3,411,794 to Allen, Nov. 19, 1968 and to Meginnis U.S. Pat. No. 3,529,905, Sept. 22, 1970. There are, however, of greatly different structure from that to be described. We are also aware that laminated bodies with passages etched or otherwise machined into the laminations have been proposed as means for providing porous structures or controlling flow through the face of the body. Disclosures along this line include the following U.S. patents: Addoms et al U.S. Pat. No. 3,413,704 Dec. 3, 1968; Kydd No. 3,457,619, July 29, 1969; Beer et al. No. 3,515,499, June 2, 1970; and Pearson U.S. Pat. No. 3,612,397, Oct. 12, 1971.

As indicated generally in FIG. 1 and more clearly in FIG. 5, the specific seal structure 22 shown in FIG. 1 is made up of a number of stacked and abutting layers or strips 23. To give some idea of possible dimensions, the strips in a particular embodiment are about 15 mils thick and about 80 to 100 mils wide, a mil being one thousandth of an inch. The strips are stacked with their edges at the seal face 24, which is the radially inner face in the structure illustrated, and the rear face 26. The strips extend circumferentially of the rotor; that is, in the direction of movement of the blades 11 with respect to the seal structure 22. The width of the seal structure, that is, its length axially of the turbine will depend upon the nature of the installation and, in the blade tip seal illustrated in FIG. 1, the distance between rings 14 and 15 might be from 1 to 2 inches. Obviously, a large number of layers must be stacked to achieve this dimension.

We have devised a method which makes it possible to achieve this deep stacking of the very narrow seal strips involving forming each strip as a part of a sheet which bears a large number of parallel seal strips and bonding the sheets together before separating the sheets so bonded into the individual seal structures or aggregations of seal strips.

Figure 3:
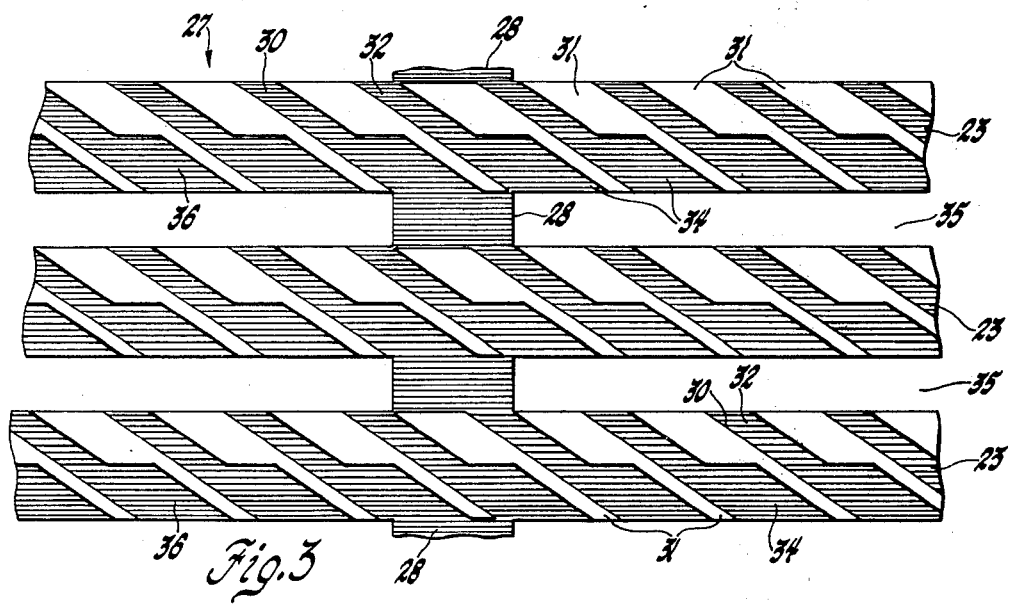
FIG. 3 is a plan view of a portion of an etched sheet at an intermediate stage in the manufacture of the seal structure.

Proceeding now to FIGS. 3 and 5, the first form of seal strip structure employs a sheet or layer 27 only a portion of which is shown greatly enlarged in FIG. 3, the sheet 27 comprising a number of strips 23 extending generally parallel, these strips being joined at intervals such as perhaps every inch or so by weak ties 28.

Sheet 27 is preferably prepared from a sheet of suitable metal by a process of photoetching, which involves cleaning and polishing the sheet, coating it with a photoresist, exposing the sheet to light with a suitable pattern overlying it, selectively washing off the photoresist, and then etching the sheet in a suitable chemical etchant bath. The sheet 27 is etched from the face illustrated in FIG. 3 to provide grooves 30 extending across each strip and leaving lands 31 in the original plane of the strip between the grooves. Preferably, the grooves 30 are of constant depth but, as will be noted, each groove comprises a relatively narrow portion 32 and a relatively wide portion 34. The narrow portion is at the edge of the strip which will be at the rear face 26 of the seal structure and the wide portion is at the seal face 24 of the seal structure. The material is etched away at the ties 28 to reduce the thickness of the material and thus make the ties less strong. The open slots 35 which separate the strips 23 except at the ties 28 are provided by etching the metal from both faces and thus cutting completely through. The grooves 30 are preferably about half the thickness of the metal or somewhat deeper. Of course, other ways of producing the sheet than photoetching might be substituted if desired.

As stated, FIG. 3 illustrates only a small portion of the area of such a sheet much enlarged; the sheet normally would be of substantial size. The horizontal dimension in FIG. 3 would be equal to the desired length of the seal segments 22 and the width several inches or more, to provide the desired number of seal strips in a single operation.

FIG. 4 illustrates in axonometric fashion the stacking of two sheets 27, the lower sheet being shown so as to exhibit its etched surface bearing the grooves 30 and lands 31 and the upper sheet 27 illustrated as viewed from the under or plain side. As will be apparent, when the sheets are so stacked they define between them the grooves 30 which occupy a relatively great portion of the volume of the strip adjacent the seal face and a relatively small portion adjacent the rear face 26.

When the sheets are stacked with the strips stacked on top of each other, they are subjected to heat and pressure in a suitable furnace and under conditions such as to achieve a diffusion bonding of the various adjacent sheets together, as is well understood by those skilled in the metallurgical art. Preferably, the ties 28 are also aligned when the parts are stacked, but this is not necessary. As will be seen in FIG. 5, when the sheets have been bonded and the stacks of strips have been separated, by sawing or otherwise, at the ties 28, the porous seal structure with the grooves is provided.

It may be mentioned at this point that the grooves 30 are inclined at an acute angle to the surfaces of the seal, about a 45° angle as illustrated. This is to give the discharged cooling air a component of velocity in the direction of movement of the blades 11 or other rotating part with which the seal element 22 cooperates.

The seal face portion of the seal structure may have a metal volume of about 30% of its total volume, whereas the rear face portion may have a metal volume of around 80% of the total volume of that portion. This metal volume ratio may be called the "metal density".

Figure 2:
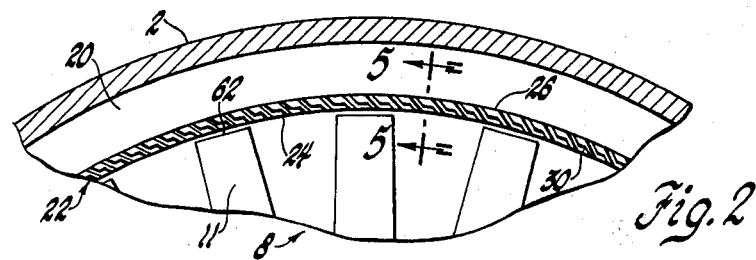
FIG. 2 is a transverse sectional view of the same taken on the plane indicated by the line 2—2 in FIG. 1.

The procedure of laying up, bonding, and separating the sheets as just described provides a straight seal strip, but it is a very simple matter to impart a curvature to this strip so that it is of an arcuate configuration as illustrated in FIG. 2 by passing the strip through appropriate rolls or exerting force on it by curved dies, for example. Alternatively, the pattern of etching may produce curved strips 23 rather than straight ones.

FIGS. 6, 7, and 8 illustrate a somewhat different seal structure which is fabricated in essentially the same way as that just described. The structure of FIG. 6 differs from that of FIG. 4 primarily in that the webs 36 between the narrow portions of lands 31 are omitted. In the structure of FIG. 6, sheets 42 are operated upon by photoetching or otherwise generally as previously described to provide strips 43 having a rear face 44 in the assembled seal structure and having grooves 46 extending across the strip. Each groove 46 includes a relatively narrow portion 47 extending part way through the strip and a wide portion 48 extending entirely through the strip. Thus the lands 50 between the grooves comprise a wide portion 51 between the groove portions 47 and a narrow free standing portion or spur 52 between the groove portions 48. The weak ties between adjacent strips are provided by lands 54, corresponding otherwise to the narrow free standing portions 52, which extend from one strip to the other, such lands 54 being present at only a relatively small proportion of the total number of lands. This structure is fabricated by etching from the face of the sheet illustrated in FIG. 6 over all of the area except that of the lands 50 (51, 52, and 54) and then etching from the rear face of the sheet to create the wide groove portion 48 and separate the land portions 52 from the adjoining strip.

Because of the lack of a web to support adjacent lands 52, the structure is stabilized by the provision of plain thin unetched intermediate sheets 55 when the sheets are stacked and bonded to provide the laminated sheet from which the seaal structures are obtained by separation of the laminated structures at ties 54. This separation may be done by sawing along edge 44 of strips 43. As shown most clearly in FIG. 8, preferably two sheets 42 are laid up together with a thin sheet 55 laid up between each set of two sheets 42. Sheets 55 are preferably slotted along edge 44 from each tie 54 to the next, to facilitate subsequent separation of the sheets, before the sheets are laid up and bonded. After the sheets have been laid up and bonded, they may readily be sawed or otherwise taken apart to form seal strips or seal structures which may be bent to the desired curvature.

Both of the seal structures illustrated are considered to be exceptionally effective in providing a cooled seal which distributes the cooling fluid through many small openings in the body of the seal structure, which has a seal face area of low density which may be abraded without undue damage to structure which comes in contact with it, and which has a fluid metering or distributing structure defined by the narrow grooves 32 or 47.

The technique of fabrication is quite feasible, involving only known techniques of photoetching and diffusion bonding. The technique is suitable for use with metals of a high temperature corrosion resistant nature suited for use as blade tip seals and other seals in turbomachinery.

It will be obvious that the seal structure 22 of FIG. 1 cooperates with the blade tip 60 to minimize flow of fluid between the higher and lower pressure faces of the blade through the narrow gap 62. Obviously, the same seal structure 22 may be used with blades bearing rotating tip shrouds which may bear seal knives and also, of course, the seal structure 22 may be used with other circumferentially ridged cooperating seal elements which are not a part of a blade structure.

The detailed description of preferred embodiments of our invention for the purpose of explaining the principles thereof is not to be considered as limiting or restricting the invention, as many modifications may be made by the exercise of skill in the art.

We claim:

1. A porous abradable seal structure adapted to provide one element of a two element fluid-cooled seal with relative movement between the two elements, the structure having a contact surface adapted to cooperate with the other element of the seal and having a rear surface, the seal structure comprising a plural number of strips, each strip having two faces and having two edges, the strips being stacked face-to-face and bonded together, with the lengthwise direction of the seal strips extending generally in the direction of relative movement of the seal elements; the strips being so disposed that the faces of the strips extend from the said contact surface to the said rear surface of the seal structure and that the edges of the stacked strips define the said contact surface and the said rear surface, and a large proportion of the strips having grooves in and extending completely across at least one face of the strip between the opposite edges thereof, to define with an abutting strip pores for flow of a fluid through the seal structure from the rear surface to the contact surface.

2. A porous abradable seal structure adapted to provide one element of a two element fluid-cooled seal with relative movement between the two elements, the structure having a contact surface adapted to cooperate with the other element of the seal having a rear surfaces, the seal structure comprising a plural number of strips, each strip having two faces and having two edges, the strips being stacked face-to-face and bonded together, with the lengthwise direction of the seal strips extending generally in the direction of relative movement of the seal elements; the strips being so disposed that the faces of the strips extend from the said contact surface to the said rear surface of the seal structure and that the edges of the stacked strips define the said contact surface and the said rear surface, and a large proportion of the strips having grooves in and extending completely across at least one face of the strip between the opposite edges thereof to define with an abutting strip pores for flow of a fluid through the seal structure from the rear surface to the contact surface, the pores being at an acute angle to the contact surface so as to discharge the fluid with a component of velocity in the direction of movement of the other seal element.

3. A porous abradable seal structure adapted to provide one element of a two element fluid-cooled seal with relative movement between the two elements, the structure having a contact surface adapted to cooperate with the other element of the seal and having a rear surface, the seal structure comprising a plural number of strips, each strip having two faces and having two edges, the strips being stacked face-to-face and bonded together, with the lengthwise direction of the seal strips extending generally in the direction of relative movement of the seal elements; the strips being so disposed that the faces of the strips extend from the said contact surface to the said rear surface of the seal structure and that the edges of the stacked strips define the said contact surface and the said rear surfave, and a large proportion of the strips having grooves in and extending completely across at least one face of the strip between the opposite edges thereof to define with an abutting strip pores for flow of a fluid through the seal structure from the rear surface to the contact surface, the grooves being of greater cross-sectional area adjacent the contact surface than adjacent the rear surface so that the portion of the seal structure adjacent the contact surface is more readily abradable than the portion adjacent the rear surface and the portion adjacent the rear surface is effective to meter flow of the fluid.

4. A porous abradable seal structure adapted to provide one element of a two element fluid-cooled seal with realtive movement between the two elements, the structure having a contact surface adapted to cooperate with the other element of the seal and having a rear surface, the seal structure comprising a plural number of strips, each strip having two faces and having two edges, the strips being stacked face-to-face and bonded together, with the lengthwise direction of the seal strips extending generally in the direction of relative movement of the seal elements; the strips being so disposed that the faces of the strips extend from the said contact surface to said rear surface of the seal structure and that the edges of the stacked strips define the said contact surface and the said rear surface; a large proportion of the strips having grooves in and extending completely across at least one face of the strip between the opposite edges thereof to define with an abutting strip pores for flow of a fluid through the seal structure from the rear surface to the contact surface, the pores being at an acute angle to the contact surface so as to discharge the fluid with a component of velocity in the direction of movement of the other seal element; and the grooves being of greater cross-sectional area adjacent the contact surface than adjacent the rear surface so that the portion of the seal structure adjacent the contact surface is more readily abradable than the portion adjacent the rear surface and the portion adjacent the rear surface is effective to meter flow of the fluid.

* * * * *